United States Patent

Jean et al.

[11] Patent Number: 5,805,310
[45] Date of Patent: Sep. 8, 1998

[54] MOTOR-DRIVEN TRANSMISSION UNIT OF A FAX MACHINE

[75] Inventors: Jaw-Kuen Jean, Taipei Hsien; Chuan-Sheng Li, Taipei; Bor-Harn Lin, Taipei Hsien, all of Taiwan

[73] Assignee: Sampo Corporation, Taipei, Taiwan

[21] Appl. No.: 695,962

[22] Filed: Aug. 13, 1996

[51] Int. Cl.[6] ................................. H04N 1/04; H04N 1/36
[52] U.S. Cl. ................... 358/498; 358/496; 358/412; 271/10.04
[58] Field of Search ........................... 358/498, 496, 358/412, 401, 501, 421, 296, 400; 271/9.01, 10.04; 399/363, 364

[56] References Cited

U.S. PATENT DOCUMENTS

| | | | |
|---|---|---|---|
| 4,866,531 | 9/1989 | Kobori et al. | 358/400 |
| 5,523,858 | 6/1996 | Yamada et al. | 358/498 |
| 5,691,826 | 11/1997 | Yeh et al. | 358/498 |

*Primary Examiner*—Kim Yen Vu
*Assistant Examiner*—Cheukfan Lee
*Attorney, Agent, or Firm*—Beveridge, DeGrandi, Weilacher & Young, LLP

[57] ABSTRACT

A transmission unit mounted on the machine base of an office automation machine and covered with a cover and controlled to turn a first roller and a second roller, including a gear transmission mechanism, a first roller having a driven gear set at one end, and a second roller having a driven gear set at one end, wherein the gear transmission mechanism includes a motor, a rounded seat raised from the machine base, a drive gear mounted on the rounded seat and coupled to the motor, a first annular gear holder and a second annular gear holder revolvably mounted around the rounded seat and having a respective upright gear shaft, a crank turned about a pivot on the machine base and having an upright gear shaft at the free end, a first planet gear revolvably mounted around the gear shaft of the first annular gear holder and driven by the drive gear to turn the driven gear set of the first roller, a second planet gear revolvably mounted around the upright gear shaft of the crank and forced by the drive gear to turn the driven gear set of the second roller in letting of the thermal paper, and a sector gear mounted around the upright gear shaft of the second annular gear holder and forced by the drive gear to turn the driven gear set of the second roller reversely through a fixed angle after each operation of the copy or incoming mode.

1 Claim, 5 Drawing Sheets

MOTOR-DRIVEN TRANSMISSION UNIT OF A FAX MACHINE

BACKGROUND OF THE INVENTION

The present invention relates to fax machines, and relates more particularly to the transmission unit of a fax machine which eliminates waste of thermal paper, and permits jammed paper to be conveniently pulled out of the machine.

The transmission unit of a fax machine comprises a first roller and a second roller. The first roller and the second roller are simultaneously rotated to let off the thermal paper during the copy or incoming mode. When at the outgoing mode, only the first roller is rotated to feed document. After the copy or incoming mode, the thermal paper is cut automatically or manually. When the thermal paper is cut off, the leading end of the rest thermal paper extends over the thermal printing head which cannot be used for printing. Furthermore, because the gears for power transmission from the motor to the first roller are maintained connected when a paper is jammed in the transmission unit, it is difficult to pull the jammed paper out of the transmission unit of the fax machine.

SUMMARY OF THE INVENTION

The present invention has been accomplished to provide a transmission unit which eliminates the aforesaid drawbacks. According to one aspect of the present invention, the transmission unit is mounted on the machine base of the fax machine and covered with a cover, comprised of a gear transmission mechanism, a first roller having a driven gear set at one end, and a second roller having a driven gear set at one end, wherein the gear transmission mechanism comprises a motor, a rounded seat raised from the machine base, a drive gear mounted on the rounded seat and coupled to the motor, a first annular gear holder and a second annular gear holder revolvably mounted around the rounded seat and having a respective upright gear shaft, a crank turned about a pivot on the machine base and having an upright gear shaft at the free end, a first planet gear revolvably mounted around the gear shaft of the first annular gear holder and driven by the drive gear to turn the driven gear set of the first roller, a second planet gear revolvably mounted around the upright gear shaft of the crank and forced by the drive gear to turn the driven gear set of the second roller in letting of the thermal paper, and a sector gear mounted around the upright gear shaft of the second annular gear holder and forced by the drive gear to turn the driven gear set of the second roller reversely through a fixed angle after each operation of the copy or incoming mode. Because the first planet gear is mounted on the first annular gear holder which is revolvably mounted on the rounded, and the second planet gear is mounted on the crank which is turned around a pivot on the machine base, the planet gears are forced to disconnect from the driven gear set of the first roller and the driven gear set of the second roller respectively when the jammed paper is pulled backwards. Therefore, the jammed paper can be easily pulled out of the fax machine.

DETAILED DESCRIPTION OF THE PREFERRED EMBODIMENT

Figure 1:
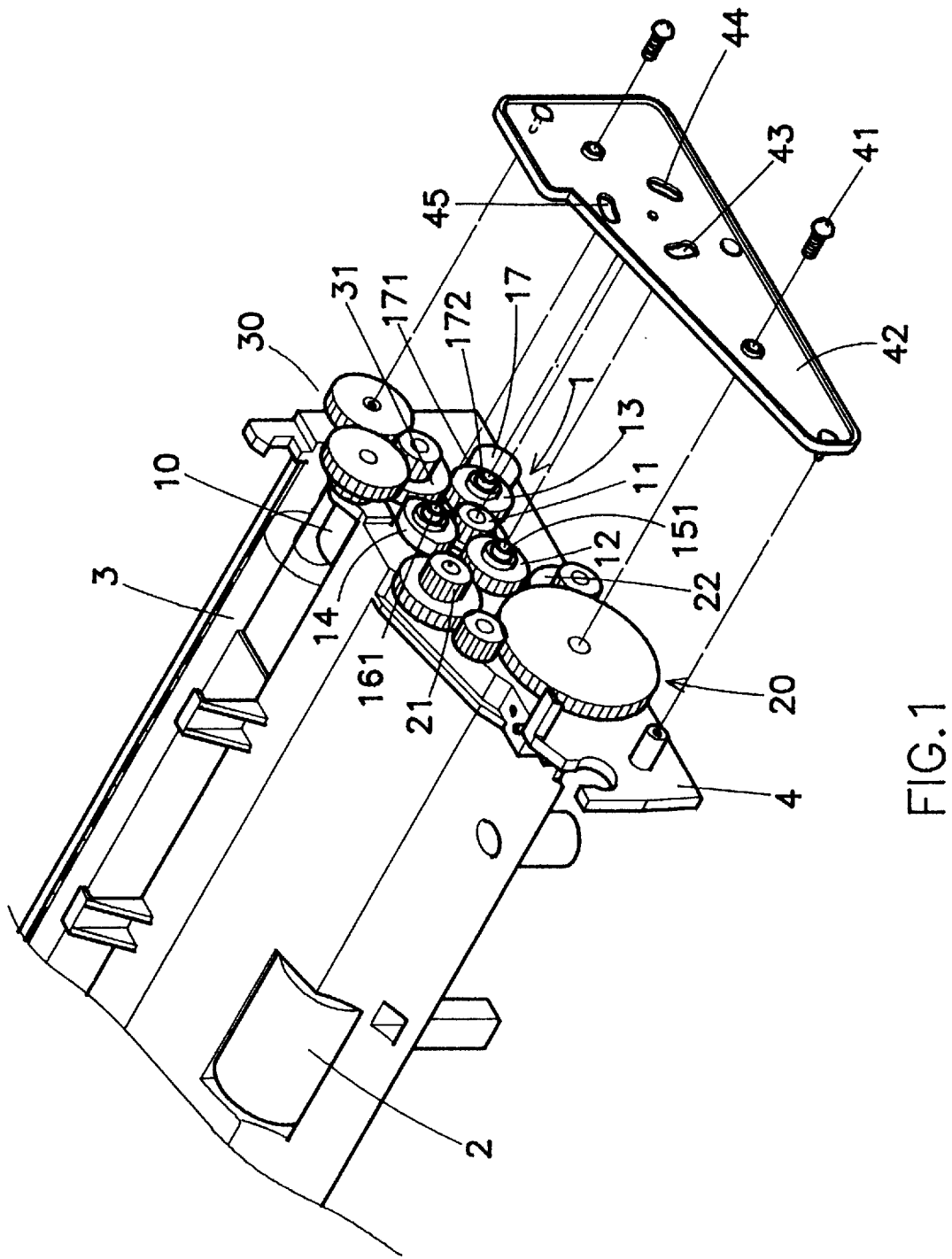
FIG. 1 is an assembly view of the gear transmission unit of a fax machine according to the present invention.
Figure 2:
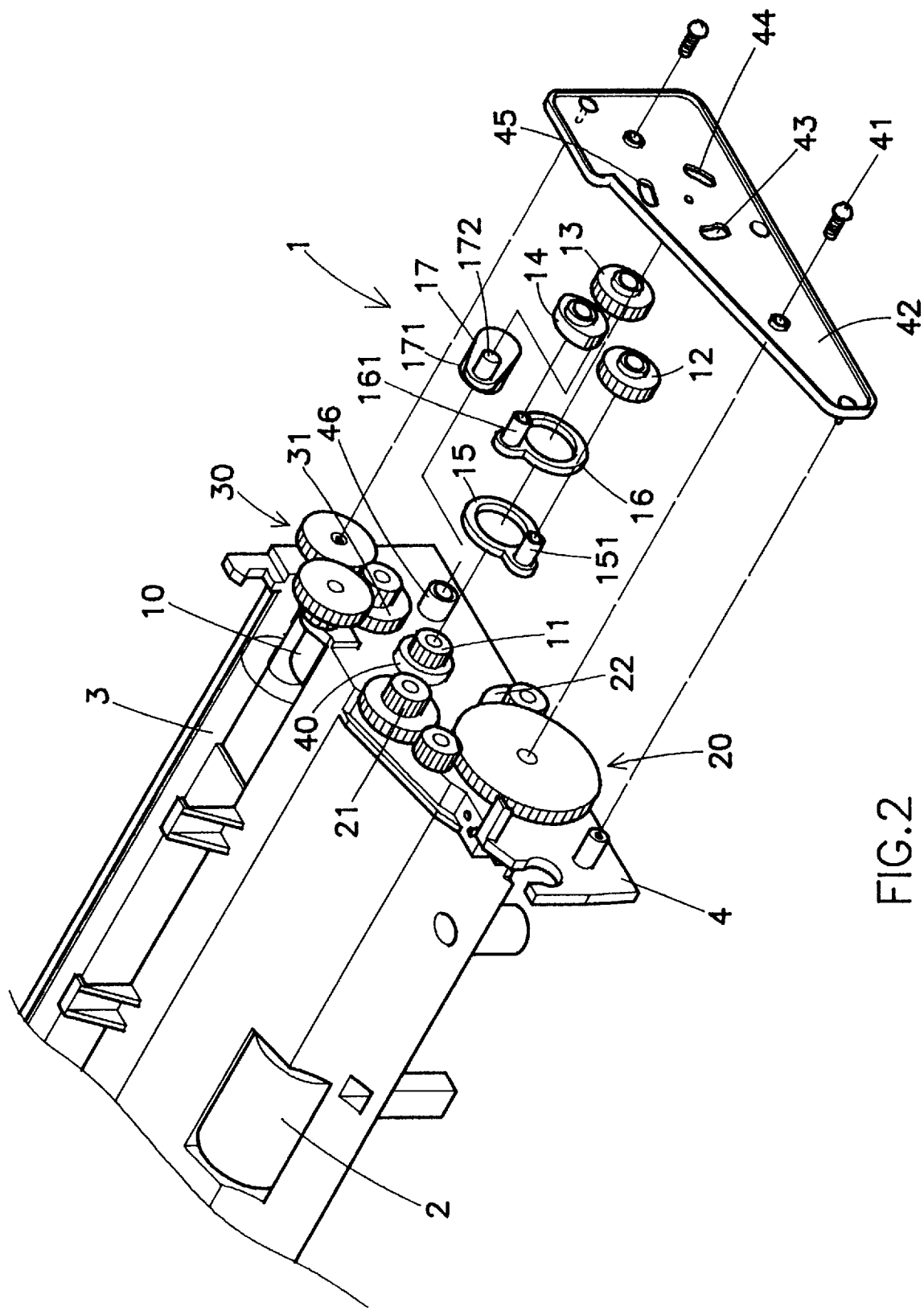
FIG. 2 is an exploded view of the gear transmission unit shown in FIG. 1.

Referring to FIGS. 1 and 2, the transmission unit of a fax machine in accordance with the present invention is mounted on the machine base 4, and comprised of a gear transmission mechanism 1, a first roller 2, and a second roller 3.

The gear transmission mechanism 1 comprises a motor 10, a drive gear 11 mounted on a rounded seat 40 at one side of the machine base 4 and coupled to the output shaft of the motor 10, a first annular gear holder 15 revolvably mounted around the rounded seat 40 and having an upright gear shaft 151, a second annular gear holder 16 revolvably mounted around the rounded seat 40 and having an upright gear shaft 161, a crank 17 having a pivot hole 171 pivoted to a pivot 46 on the machine base 4 and an upright gear shaft 172 at an opposite end, a first planet gear 12 revolvably mounted around the gear shaft 151 of the first annular gear holder 15 and meshed with the drive gear 11 at one side, a sector gear 14 revolvably mounted around the upright gear shaft 161 of the second annular gear holder 16 and meshed with the drive gear 11, a second planet gear 13 revolvably mounted around the upright gear shaft 172 of the crank 17 and meshed with the drive gear 11.

The first roller 2 and the second roller 3 are respectively disposed at two opposite sides by the drive gear 11, having a respective driven gear set 20, 30 respectively mounted on the machine base 4 at two opposite sides relative to the drive gear 11, and adapted to receive the driving power of the drive gear 11 through the planet gears 12, 13 and the sector gear 14. The driven gear set 20 of the first roller 2 comprises a first idle wheel 21 and a second idle wheel 22. When the gear transmission mechanism 1 and the driven gear sets 20, 30 are installed, a cover 42 is fastened to the machine base 4 by screws 41 and covered over the gear transmission mechanism 1 and the driven gear sets 20, 30. The cover 42 has arched guide slots 43, 44, 45 which receive the upright gear shaft 151 of the first annular gear holder 15, the upright gear shaft 161 of the second annular gear holder 16, and the upright gear shaft 172 of the crank 17 to guide the movement of the first planet gear 12, the second planet gear 13, and the sector gear 14 along the teeth of the drive gear 11 within a fixed angle respectively.

Figure 3:
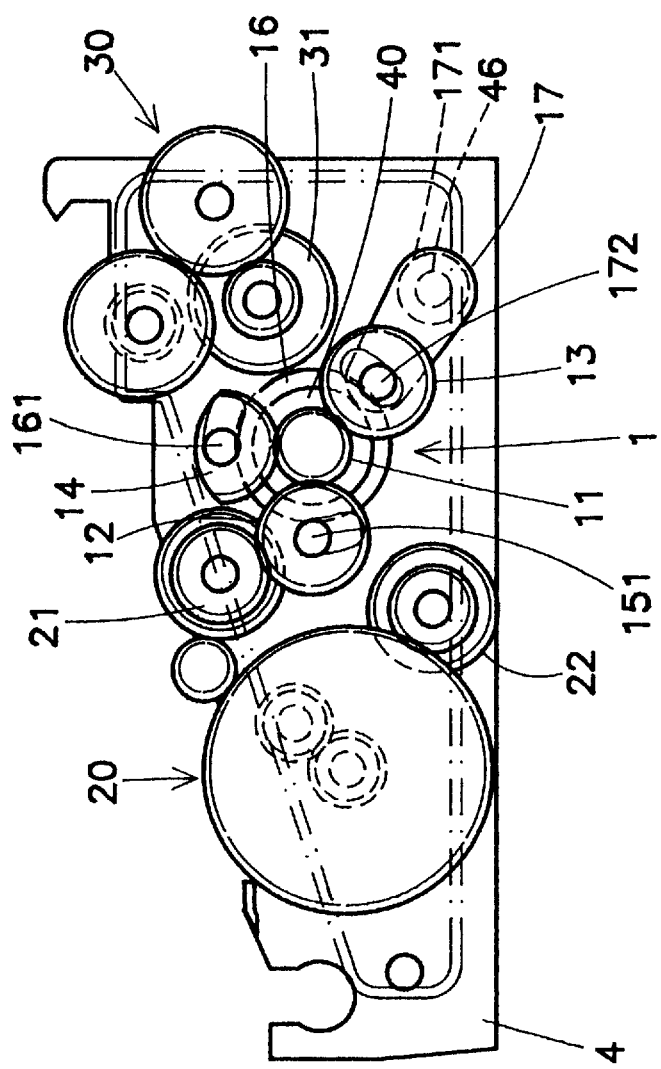
FIG. 3 is a plain view of the gear transmission unit shown in FIG. 1, showing the motor turned clockwise.

Referring to FIG. 3, when the motor 10 turns clockwise during the outgoing mode of the fax machine, the second roller 3 does no work, the first planet gear 12 of the gear transmission mechanism 1 is forced into engagement with the first idle wheel 21 of the driven gear set 20 of the first roller 2, thereby causing the first roller 2 to be turned to feed document forwards.

Figure 4:
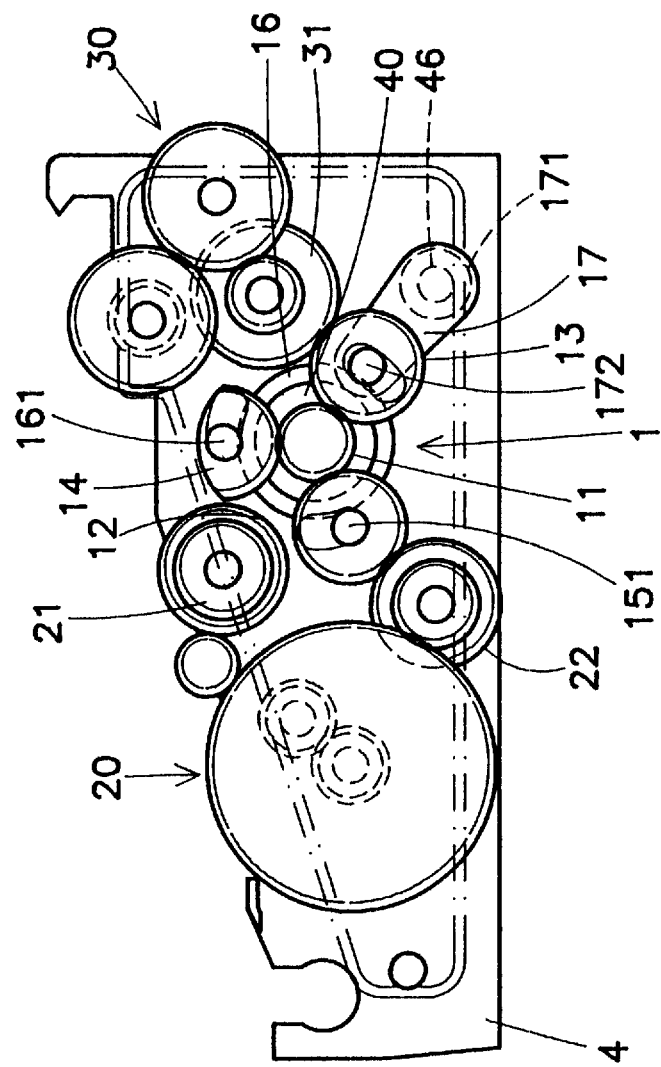
FIG. 4 is another plain view of the gear transmission unit shown in FIG. 1, showing the motor turned counter-clockwise.

Referring to FIG. 4, when the motor 10 turns counter-clockwise during the incoming or copy mode of the fax machine, the first planet gear 12 is forced into engagement with the second idle wheel 22 of the driven gear set 20 of the first roller 2, and the second planet gear 13 is forced into engagement with the power input gear 31 of the driven gear set 30 of the second roller 3, and therefore the first roller 2 and the second roller 3 are simultaneously turned to let off the thermal paper.

Figure 5:
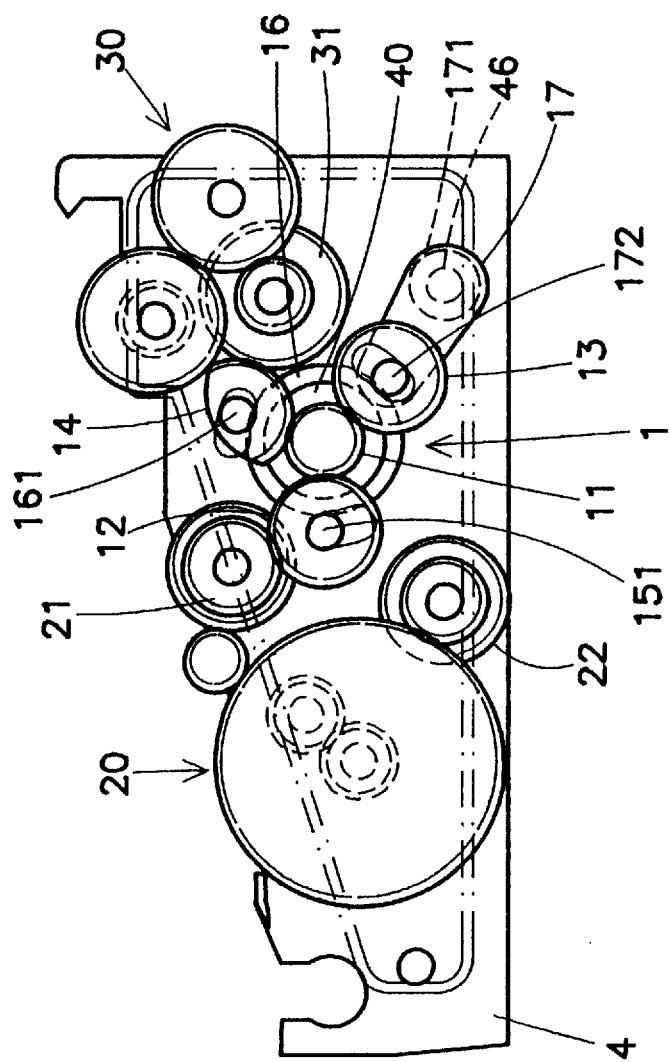
FIG. 5 is still another plain view of the gear transmission unit shown in FIG. 1, showing the sector gear forced into engagement with the power input gear of the driven gear set of the second roller and turned.

Referring to FIG. 5, when an incoming or copy operation is completed, the motor (step motor) 10 is turned clockwise through a certain number of steps to force the sector gear 14 into engagement with the power input gear 31 of the driven gear set 30 of the second roller 3, causing the second roller 3 to be turned reversely through a certain angle, and therefore the thermal paper is turned to retract its leading end, which passes over the thermal printing head. This design saves the consumption of the thermal paper. Further, because the first planet gear 12 and the second planet gear 13 are respectively mounted on the first annular gear holder 15 and the crank 17, they are movable relative to each other, and the engagement between the drive gear 11 and the planet gears 12, 13 can be respectively adjusted without causing an interference, and therefore jammed document can be easily pulled out of the machine. Because the annular gear holders 15, 16 are revolvably mounted around the rounded seat 40, when document is pulled back, the planet gears 12, 13 are forced to disconnect from the driven gear sets 20, 30, therefore the drive gear 11 is disengaged from the driven gear sets 20, 30, permitting the first roller and the second roller to be freely rotated.

It is to be understood that various modifications and changes could be made thereunto without departing from the spirit and scope of the invention disclosed.

We claim:

1. A transmission unit mounted on the machine base of a fax machine and covered with a cover, comprising a gear transmission mechanism, a first roller having a driven gear set at one end and turned by said gear transmission mechanism to feed document, a second roller having a driven gear set at one end and turned by said gear transmission mechanism to let off a thermal paper for printing, wherein said gear transmission mechanism comprises a motor, a rounded seat raised from one side of said machine base, a drive gear mounted on said rounded seat and turned by said motor, a first annular gear holder revolvably mounted around said rounded seat and having an upright gear shaft, a second annular gear holder revolvably mounted around said rounded seat and having an upright gear shaft, a pivot raised from said machine base adjacent to said rounded seat, a crank having a fixed end turned around said pivot and a free end fixedly mounted with an upright gear shaft, a first planet gear revolvably mounted around the upright gear shaft of said first annular gear holder and driven by said drive gear to turn the driven gear set of said first roller, a second planet gear revolvably mounted around the upright gear shaft of said crank and meshed between said drive gear and said driver gear of said second roller and driven by said drive gear to turn the driven gear set of said second roller in letting off the thermal paper, and a sector gear revolvably mounted around the upright gear shaft of said second annular gear holder and forced by said drive gear to the driven gear set of said second roller reversely through a fixed angle after each operation of said second roller in letting off the thermal paper; said cover has three arched slots, which receive the upright gear shafts of said first annular gear holder, said second annular gear holder, and said crank to guide the movement of said first planet gear, said second planet gear, and said sector gear along the teeth of said drive gear within a fixed angle respectively.

* * * * *